(12) United States Patent
Kaur et al.

(10) Patent No.: US 11,893,072 B2
(45) Date of Patent: *Feb. 6, 2024

(54) METHODS AND APPARATUS FOR AUTOMATICALLY SERVICING ITEM DATA REQUESTS

(71) Applicant: Walmart Apollo, LLC, Bentonville, AR (US)

(72) Inventors: Tamandeep Kaur, Sunnyvale, CA (US); Rahul Raghavan, Sunnyvale, CA (US); Karthik Chowdavarapu, Sunnyvale, CA (US); Sitansu Sekhar Pal, San Jose, CA (US); Murabbat Rifaquat Hussain, Fremont, CA (US); Rajanikanth Beesabathini, Santa Clara, CA (US); Alok Kumar Singh, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,157

(22) Filed: Jan. 27, 2023

(65) Prior Publication Data
US 2023/0169132 A1    Jun. 1, 2023

Related U.S. Application Data

(63) Continuation of application No. 16/895,787, filed on Jun. 8, 2020, now Pat. No. 11,609,960.

(51) Int. Cl.
*G06Q 30/00*    (2023.01)
*G06F 16/9537*    (2019.01)
*G06Q 30/0601*    (2023.01)

(52) U.S. Cl.
CPC ..... *G06F 16/9537* (2019.01); *G06Q 30/0601* (2013.01)

(58) Field of Classification Search
None
See application file for complete search history.

(56) References Cited

U.S. PATENT DOCUMENTS 4,665,518 A * 5/1987 Champlin ............. H04L 12/433
370/468
5,517,184 A * 5/1996 Miller ................ G07C 9/00912
340/5.55

(Continued)

*Primary Examiner* — Luis A Brown
(74) *Attorney, Agent, or Firm* — Morgan, Lewis & Bockius LLP; Manita Rawat

(57) ABSTRACT

This application relates to apparatus and methods for automatically servicing item data requests in data management systems, such as in retail management systems. The apparatus and methods employ a throttling technique to service data requests from one or more entities. In some examples, a computing device initializes assigns a counter for each entity, and initializes each counter with an initial value. The computing device also occasionally (e.g., periodically) resets each counter to the initial value. The computing device may receive a data request from one of the entities, and determines whether the counter corresponding to the entity identifies a count that is beyond a threshold. If the counter identifies a count beyond the threshold, the computing device adjusts the counter, and processes the data request. If the counter does not identify a count beyond the threshold, the computing device responds to the entity with an error.

18 Claims, 7 Drawing Sheets

(56) References Cited

U.S. PATENT DOCUMENTS

| | | | | |
|---|---|---|---|---|
| 7,774,491 B2* | 8/2010 | Alvarez | H04L 9/40 | 370/230.1 |
| 7,895,353 B2* | 2/2011 | Jansson | H04L 47/10 | 710/60 |
| 8,005,933 B2* | 8/2011 | Brown | H04L 67/1001 | 709/224 |
| 8,281,382 B1* | 10/2012 | Sanyal | G06F 40/205 | 705/54 |
| 8,290,919 B1* | 10/2012 | Kelly | G06F 16/137 | 707/968 |
| 8,671,385 B2* | 3/2014 | Byrd | G06F 21/604 | 717/106 |
| 9,906,624 B2* | 2/2018 | Bielski | H04L 67/62 | |
| 10,909,830 B1* | 2/2021 | Stapleford | H04W 4/90 | |
| 11,165,816 B2* | 11/2021 | Torgerson | H04L 41/0273 | |
| 2004/0267982 A1* | 12/2004 | Jackson | G06F 13/385 | 710/52 |
| 2006/0218429 A1* | 9/2006 | Sherwin | G06F 9/4825 | 713/502 |
| 2011/0035505 A1* | 2/2011 | Jakobsson | H04L 63/10 | 709/229 |
| 2014/0016614 A1* | 1/2014 | Velev | H04W 4/70 | 370/331 |
| 2014/0022263 A1* | 1/2014 | Hartog | G06T 1/20 | 345/506 |
| 2014/0173092 A1* | 6/2014 | Uluderya | H04L 67/1008 | 709/224 |
| 2015/0039747 A1* | 2/2015 | Meloche | H04L 9/40 | 709/224 |
| 2015/0120808 A1* | 4/2015 | Bielski | H04L 67/62 | 709/203 |
| 2015/0207823 A1* | 7/2015 | Mahbod | H04L 67/60 | 709/228 |
| 2015/0269377 A1* | 9/2015 | Gaddipati | G06F 21/44 | 726/30 |
| 2016/0134116 A1* | 5/2016 | Carlson | H02J 13/00007 | 709/206 |
| 2019/0104015 A1* | 4/2019 | Moore | H04L 67/141 | |
| 2019/0306189 A1* | 10/2019 | Torgerson | H04L 9/3213 | |
| 2020/0162346 A1* | 5/2020 | Diaz-Cuellar | G06F 21/105 | |
| 2020/0257539 A1* | 8/2020 | Borlick | G06N 20/00 | |
| 2020/0301608 A1* | 9/2020 | Park | G06F 3/0604 | |
| 2020/0371817 A1* | 11/2020 | Hsu | G11C 11/406 | |

* cited by examiner

METHODS AND APPARATUS FOR AUTOMATICALLY SERVICING ITEM DATA REQUESTS

CROSS-REFERENCE TO RELATED APPLICATION

This application is a continuation of U.S. patent application Ser. No. 16/895,787, filed Jun. 8, 2020, and entitled "Methods and Apparatus for Automatically Servicing Item Data Requests," which is incorporated herein in its entirety by reference.

TECHNICAL FIELD

The disclosure relates generally to servicing data requests and, more specifically, to automatically servicing item data requests in data management systems, such as retail management systems.

BACKGROUND

Retailers, in at least some examples, sell items, such as products or services, online, such as on websites (e.g., online marketplaces). For example, a retailer may advertise a product on a website where a customer can view the product and proceed to purchase the product. Typically, the website offers information on the item, such as an item description, item options, and a price. The information may be provided by a retail management system, which may identify items that are to be sold on the website. In some examples, suppliers of an item provide the information to the retail management system. Additionally or alternatively, retailers may sell items in stores. When a customer purchases an item, whether on a website or in a store, a retail management system may track the purchase. For example, the retail management system may electronically store an indication of the items purchased and their corresponding price. The retail management system may also track returns of an item, such as when an item is returned at a store, or returned via the website (and, for example, shipped back to the retailer).

As such, retail management systems service data requests, such as for item information, from various sources. For example, a retail management system may service a request from a supplier to update item information on a website. The retail management system may further receive a request for item information from a website, such as item information for items to be sold on the website. Further, the retail management system may service requests for purchases and returns, such as from the website or from one or more stores. Many legacy systems, however, have limited processing capacity and may not scale readily to support larger volumes of data requests. For example, retail management systems of retailers with multiple sales channels, such as retailers with multiple stores and/or websites, may become overwhelmed with the number of requests. As a result, the number of requests may slow down the retail management system as it attempts to handle the large number of requests. As such, there are opportunities to improve the servicing of data requests, such as in retail management systems.

SUMMARY

The embodiments described herein are directed to automatically servicing data requests, such as item data requests, in retail management systems in a way that protects the retail management system from being overloaded by such requests. The data requests may be provided by a plurality of entities (e.g., consumers of the retail management systems), such as stores, websites (e.g., via web servers), suppliers (e.g., via servers), or any other entity requesting access to data. The embodiments may employ a throttling design that occasionally (e.g., periodically) limits a number of requests from each entity. In some examples, the embodiments allow a retailer to control how much processing power they are willing to allocate to servicing data requests from each of a plurality of entities.

As such, the embodiments may improve the operation of retail management systems. For example, the embodiments may reduce the load experienced by portions of the retail management system, and may improve response times to the data requests. The embodiments may allow a retail management system with limited processing capacity to more efficiently support larger volumes of data requests that would otherwise bog down the retail management system. In addition to or instead of these example advantages, persons of ordinary skill in the art would recognize and appreciate other advantages as well.

In accordance with various embodiments, exemplary systems may be implemented in any suitable hardware or hardware and software, such as in any suitable computing device. In some embodiments, a computing device initializes assigns a counter for each entity, and initializes each counter with an initial value. The computing device also occasionally (e.g., periodically) resets each counter to the initial value. The computing device may receive a data request from one of the entities, and determines whether the counter corresponding to the entity identifies a count that is beyond a threshold. If the counter identifies a count beyond the threshold, the computing device adjusts the counter, and processes the data request. If the counter does not identify a count beyond the threshold, the computing device responds to the entity with an error.

In some embodiments, a computing device is configured to receive a first data request from a first entity. The first data request may be to read data from, or write data to, a database, for example. The first entity may be another computing device, such as a server. The computing device may be configured to adjust a first counter in response to receiving the first data request from the first entity. For example, the computing device may increase, or decrease, the first counter. The computing device may also be configured to determine whether the first counter is beyond a first threshold. The computing device may further be configured to generate a first response to the first data request based on the determination of whether the first counter is beyond the first threshold. The computing device may also be configured to transmit the first response to the first entity.

In some embodiments, the computing device is configured to initialize the first counter to an initial value. The computing device may also be configured to determine when a first period expires, and reset the first counter to the initial value when the first period expires.

In some embodiments, a method is provided that includes receiving a first data request from a first entity, and adjusting a first counter in response to receiving the first data request from the first entity. The method may further include determining whether the first counter is beyond a first threshold. The method may also include generating a first response to the first data request based on the determination of whether the first counter is beyond the first threshold. The method may further include transmitting the first response to the first entity.

In some embodiments, the method includes initializing the first counter to an initial value. The method may also include determining when a first period expires, and resetting the first counter to the initial value when the first period expires.

In yet other embodiments, a non-transitory computer readable medium has instructions stored thereon, where the instructions, when executed by at least one processor, cause a computing device to perform operations that include receiving a first data request from a first entity, and adjusting a first counter in response to receiving the first data request from the first entity. The operations may further include determining whether the first counter is beyond a first threshold. The operations may also include generating a first response to the first data request based on the determination of whether the first counter is beyond the first threshold. The operations may further include transmitting the first response to the first entity.

In some embodiments, the operations include initializing the first counter to an initial value. The operations may also include determining when a first period expires, and resetting the first counter to the initial value when the first period expires.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
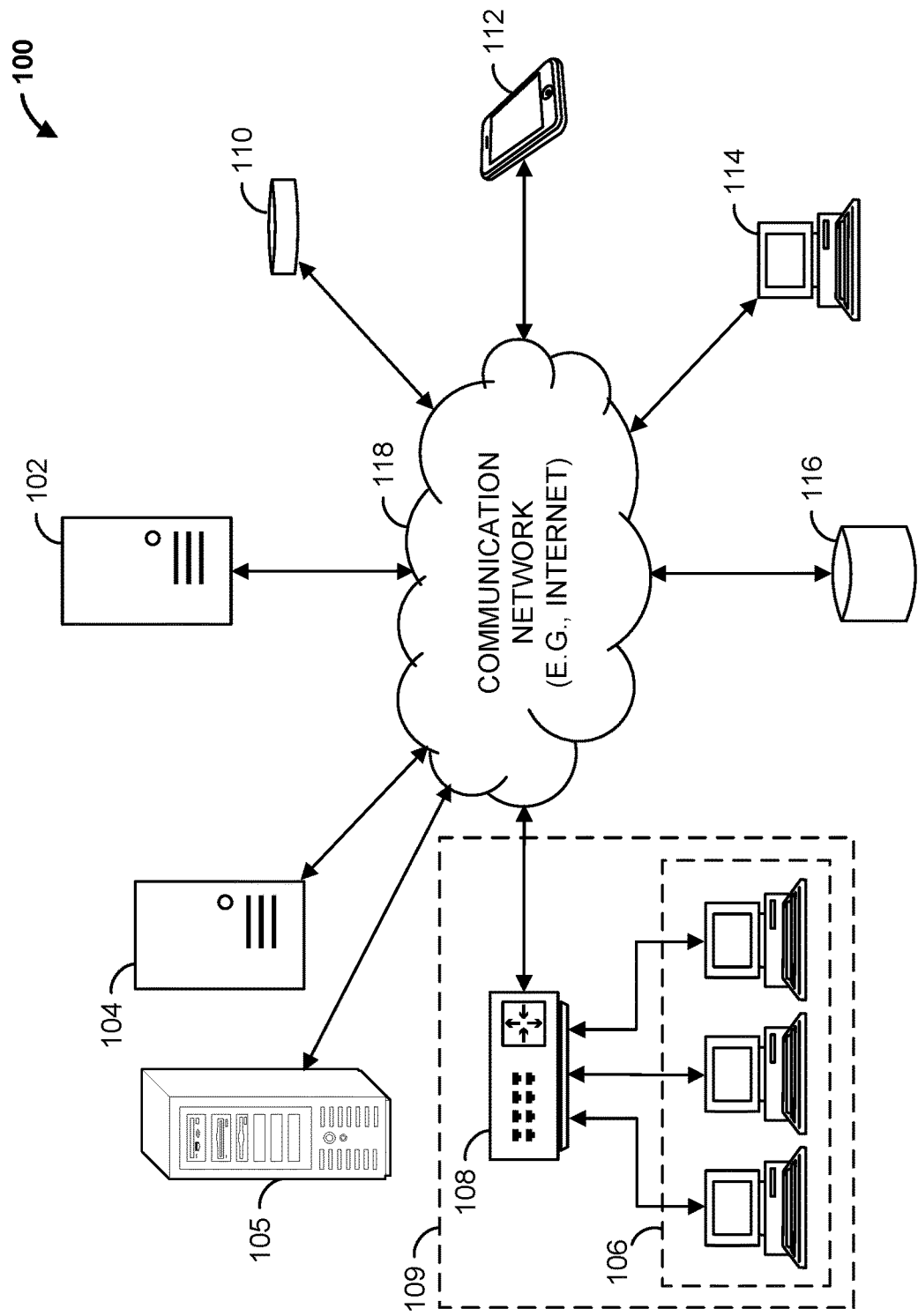
FIG. 1 is a block diagram of a protected retail management system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an protected retail management system 100 that includes a data request protection computing device 102 (e.g., a server, such as an application server), a web server 104, workstation(s) 106, database 116, an item data update system 105, and multiple customer computing devices 110, 112, 114 operatively coupled over network 118. Data request protection computing device 102, workstation(s) 106, web server 104, item data update system 105, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, each of data request protection computing device 102 and item data update system 105 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, data request protection computing device 102 is operated by a retailer, and multiple customer computing devices 112, 114 are operated by customers of the retailer.

Although FIG. 1 illustrates three customer computing devices 110, 112, 114, protected retail management system 100 can include any number of customer computing devices 110, 112, 114. Similarly, protected retail management system 100 can include any number of data request protection computing devices 102, workstation(s) 106, web servers 104, item data update systems 105, and databases 116.

Data request protection computing device 102 is operable to communicate with database 116 over communication network 118. For example, data request protection computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to data request protection computing device 102, in some examples, database 116 can be a local storage device, such as a hard drive, a non-volatile memory, or a USB stick. In some examples, data request protection computing device 102 stores item data in database 116. The item data may include, for example, one or more of an item identifier (e.g., item ID), an item description, an item price, an item image, item options, an item brand, an item manufacturer, or any other data related to the item.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Workstation(s) 106 are operably coupled to communication network 118 via router (or switch) 108. Workstation(s) 106 and/or router 108 may be located at a store 109, for example. Workstation(s) 106 can communicate with data request protection computing device 102 over communication network 118. The workstation(s) 106 may send data requests to data request protection computing device 102. For example, the workstation(s) 106 may send data to, and receive data from, data request protection computing device 102. For example, the workstation(s) 106 may transmit data related to a purchase order, such as for the purchase of one or more items at store 109, to framed image computing device 102. The data may include, for example, an item identifier for the item, a description of the item, a price of the item, an item brand, an item manufacturer, or any other data related to the return of the item. In some examples, data request protection computing device 102 receives the data transmitted from the workstation(s) 106 and, in response, may transmit an acknowledgement of receipt and/or a confirmation of the purchase order.

In some examples, workstation(s) 106 request data related to the return of one or more items from data request protection computing device 102. For example, a customer may return a previously purchased item to store 109. As part of the return process, workstation(s) 106 may transmit data identifying the returned item, such as an item identifier for the item, and in response receive from data request protection computing device 102 a description of the item, a price of the item, or any other data related to the return of the item.

In some examples, web server 104 hosts one or more web pages, such as a retailer's website. For example, web server 104 may host an online marketplace where customers may view and purchase items. Customers may, via customer computing devices 110, 112, 114 communicating with web server 104 over communication network 118, visit the online marketplace and view item listings. Customers may also purchase the listed items via the online marketplace. For example, the online marketplace may provide an "add-to-cart" that, when engaged (e.g., clicked on) by the customer, facilitates the placement of items into an online shopping cart. The online marketplace may further provide a "checkout" icon that facilitates the purchase of the items in the online shopping cart.

In at least some examples, web server 104 sends data requests to data request protection computing device 102. For example, web server 104 may request data related to item listings from data request protection computing device 102. The data may include, for each of a plurality of items, one or more of an item ID, an item description, an item price, item options, an item image, or any other data related to each item. Web server 104 may display on a website at least a portion of the data received, allowing customers that visit the website to purchase the item. As another example, web server 104 may transmit data related to the return of an item to data request protection computing devices 102.

Item data update system 105 may be operated by retailers or manufacturers, and may send data requests to data request protection computing device 102. For example, item data update system 105 may transmit to data request protection computing devices 102 data related to items sold on a website hosted by web server 104. For example, various manufactures may provide, via corresponding item data update systems 105, data related to items they sell on the website. The data may include for each item, for example, one or more of an item price, an item description, item options, item brand, item images, or any other data related to each item or the sale of each item.

As such, data request protection computing device 102 may receive data requests from one or more of web servers 104, stores 109, and item data update systems 105. Each data request may include, for example, a request to obtain data, or a request to provide data, such as item data as described above and further herein. To process the data requests, data request protection computing devices 102 employs a throttling technique to determine how to handle each data request. The throttling technique may be enabled, or disabled, in some examples.

For example, data request protection computing device 102 may assign a throttling count to each device (e.g., customer) that provides data requests. For example, data request protection computing device 102 may assign a first throttling count to web server 104, a second throttling count to store 109, and a third throttling count to item data update system 105. Each of the throttling counts may be any value, such as 10, 20, 30, 50, 100, 500, 1000, or any other value. For example, the first throttling count may be 100, the second throttling count may be 50, and the third throttling count may also be 100.

The throttling counts may be stored in memory, such as database 116, for example. In some examples, a of data request protection computing device 102 configures the throttling counts. Data request protection computing device 102 may initialize a throttling counter with a corresponding throttling count for each device. For example, data request protection computing device 102 may initialize a first throttling counter with the first throttling count, a second throttling counter with the second throttling count, and a third throttling counter with the third throttling count.

Data request protection computing device 102 may also maintain at least one timer. The timer may be a hardware timer, or a software timer (e.g., a timer implemented in software executed by a processor), for example. Data request protection computing device 102 may initialize the timer to an initial value (e.g., period). For example, data request protection computing device 102 may initialize the timer to one minute, five minutes, an hour, or any other value. In some examples, a user configures the initial value for the timer. Data request protection computing device 102 may enable the timer (e.g., to begin counting). In some examples, when the timer expires (e.g., the initial value of time has passed), data request protection computing device 102 may reset the timer to the initial value. In some examples, upon expiration, the timer automatically reinitializes. When the timer expires, data request protection computing device 102 resets all throttling counters to their corresponding throttling counts. For example, data request protection computing device 102 may receive an interrupt upon the timer expiring. Data request protection computing device 102 may execute an interrupt service routine (ISR) upon receiving the interrupt. The ISR may reset the first throttling counter to the first throttling count, the second throttling counter to the second throttling count, and the third throttling counter to the third throttling count. In some examples, the timer is polled to determine when the timer has expired.

Upon receiving a data request from a device, data request protection computing device 102 may determine whether the throttling counter corresponding to the device is beyond (e.g., at or above, or below) a threshold. For example, data request protection computing device 102 may determine whether the corresponding throttling counter is at zero. If the throttling counter is beyond the threshold (e.g., above zero), data request protection computing device 102 may process the data request. For example, for a read request, data request protection computing device 102 may obtain corresponding data from database 116, and provide the obtained data in response to the request. If, as another example, the data request is a write request, data request protection computing device 102 may write the corresponding data to database 116. Data request protection computing device 102 may also adjust (e.g., decrement) the corresponding throttling counter.

If, however, the throttling counter is not beyond the threshold (e.g., at zero), data request protection computing device 102 may respond to the data request with an error. In some examples, data request protection computing device 102 responds with a "TOO_MANY_REQUESTS" error (e.g., an HTTP 429 error). In some examples, the response identifies the remaining amount of time in the timer. For example, data request protection computing device 102 may read the value of the timer, and generate a time value based on the read time. Data request protection computing device 102 may include the time value in the error response.

When responding with an error, data request protection computing device 102 may, in some examples, adjust the corresponding throttling counter such that, if the throttling counter is not reset (e.g., in response to the timer expiring) before the next data request is received from the corresponding device, data request protection computing device 102 will still respond to the next data request with another error. In some examples, data request protection computing device 102 does not adjust the corresponding throttling counter.

In some examples, upon expiration of the timer, data request protection computing device 102 reads the values of all throttling counters and stores (e.g., saves) them into memory (e.g., database 116). In some examples, data request protection computing device 102 may employ more than one timer. For example, data request protection computing device 102 may configure multiple timers, where each timer is programmed with a different initial value. For example, a first time may be initialized with a value corresponding to thirty seconds, a second timer may be initialized with a value corresponding to two minutes, and a third timer may be initialized with a value corresponding to five minutes. Each throttling counter may be associated with one of the timers, such that, upon expiration of each timer, the corresponding throttling counters are reset with their corresponding initial values.

In some examples, rather than a timer, data request protection computing device 102 employs a rolling window of time for each device. Specifically, upon receiving a data request from a device, data request protection computing device 102 determines whether the device has transmitted more than a threshold number of requests over the rolling window of time (e.g., over the last thirty seconds, over the last minute, over the last five minutes, etc.). Data request protection computing device 102 will process each data request if the device has not transmitted more than the threshold number of data requests over the rolling window of time. Otherwise, if the device has transmitted at least the threshold number of data requests over the rolling window of time, data request protection computing device 102 responds with an error. In some examples, the response includes how many data requests the device transmitted over the rolling window of time.

In some examples, a device may request an adjustment to their assigned throttling counts. For example, web server 104 may transmit a throttling count adjustment request to data request protection computing device 102. The throttling count adjustment request may be a request to increase the throttling count currently assigned to the device. In some examples, the throttling count adjustment request identifies an adjustment amount. Data request protection computing device 102 may provide the throttling count adjustment request to an operator of data request protection computing device 102. For example, data request protection computing device 102 may display the throttling count adjustment request to the operator, or may send a communication (e.g., email, SMS (text), etc.) to the operator identifying the throttling count adjustment request. The operator may determine whether to grant the request and, if granted, may cause data request protection computing device 102 to update the throttling count associated with the device based on the request.

In some examples, if the throttling count adjustment request identifies an adjustment amount, the operator may grant an amount lower, or greater, than that requested. For example, if the throttling count adjustment request identifies a 100% increase to the current throttling amount, the operator may cause data request protection computing device 102 to update the throttling count associated with the device to be increased by 50%.

In some examples, data request protection computing device 102 may execute one or more algorithms, such as a machine learning model, to determine whether the request should be granted. For example, data request protection computing device 102 may execute a machine learning model to determine whether protected retail management system 100 can handle an increase in data requests from the device without impacting (e.g., negatively affecting) protected retail management system 100 by more than predetermined amounts.

Figure 2:
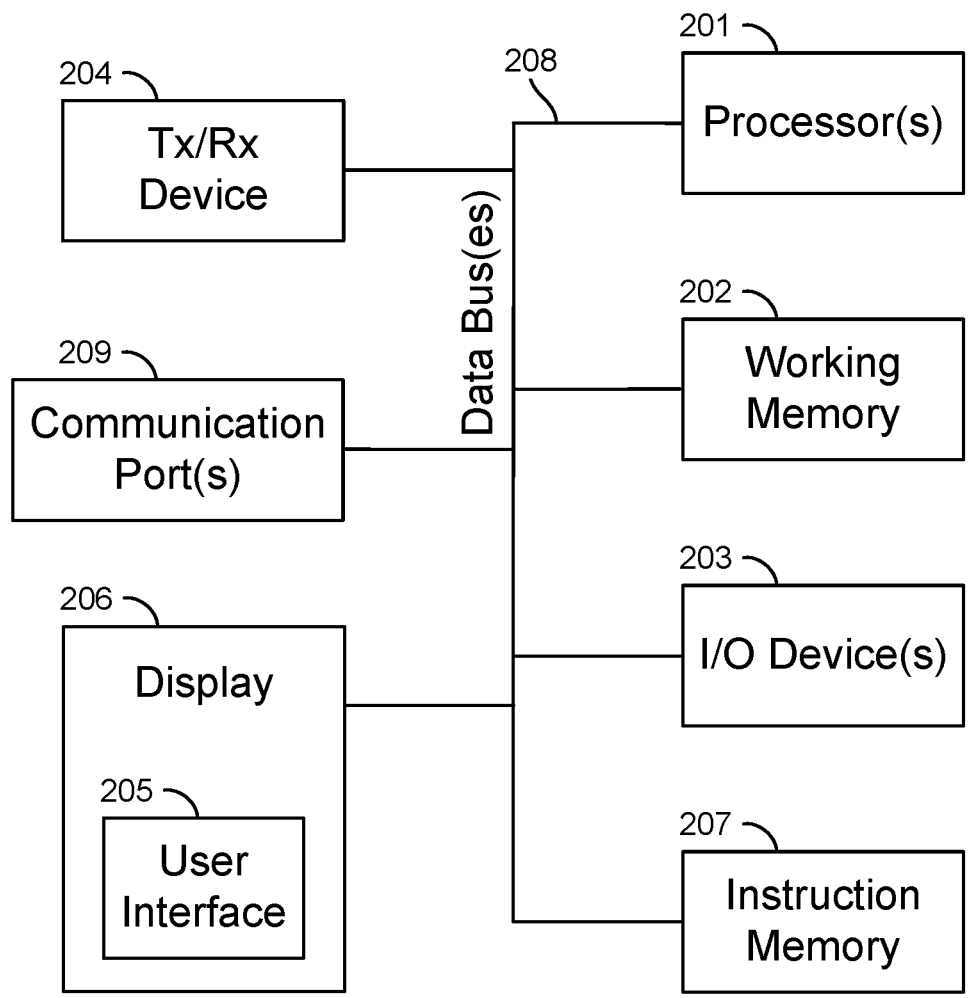
FIG. 2 is a block diagram of a data request protection computing device of the protected retail management system of FIG. 1 in accordance with some embodiments.

FIG. 2 illustrates the data request protection computing device 102 of FIG. 1. Data request protection computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 207, embodying the function or operation. For example, processors 201 can be configured to execute code stored in instruction memory 207 to perform one or more of any function, method, or operation disclosed herein.

Additionally processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of data request protection computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as item data.

Display 206 can display user interface 205. User interfaces 205 can enable user interaction with data request protection computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 data request protection computing device 102 will be operating in. Processor(s) 201 is operable to receive data from, or send data to, a network, such as communication network 118 of FIG. 1, via transceiver 204.

Figure 3:
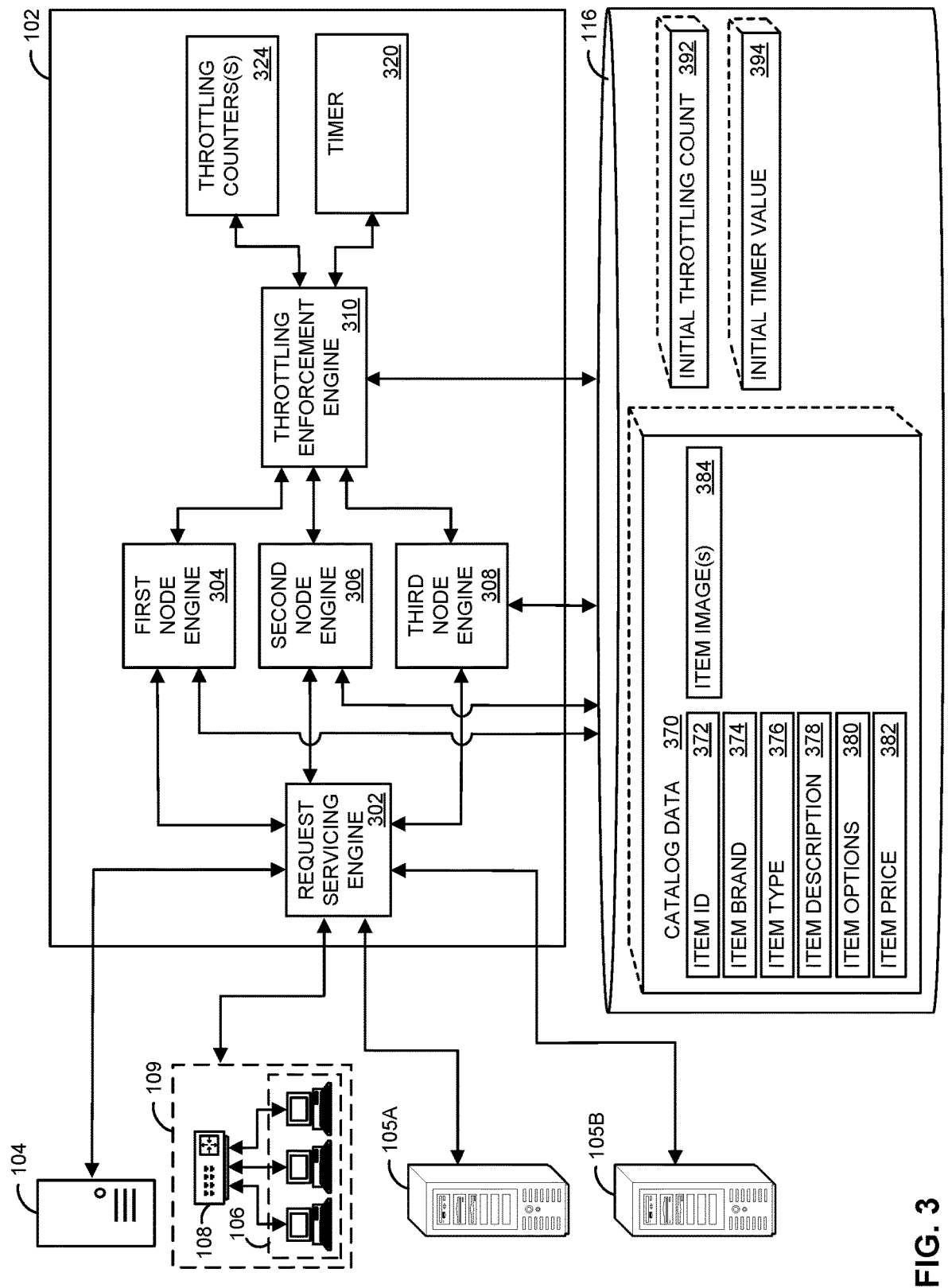
FIG. 3 is a block diagram illustrating examples of various portions of the protected retail management system of FIG. 1 in accordance with some embodiments.

FIG. 3 is a block diagram illustrating examples of various portions of the protected retail management system 100 of FIG. 1. As indicated in the figure, data request protection computing device 102 includes request servicing engine 302, first node engine 304, second node engine 306, third node engine 308, and throttling enforcement engine 310. In some examples, one or more of request servicing engine 302, first node engine 304, second node engine 306, third node engine 308, and throttling enforcement engine 310 may be implemented in hardware. In some examples, one or more of request servicing engine 302, first node engine 304, second node engine 306, third node engine 308, and throttling enforcement engine 310 may be implemented as an executable program maintained in a tangible, non-transitory memory, such as instruction memory 207 of FIG. 2, that may be executed by one or processors, such as processor 201 of FIG. 2.

Request servicing engine 302 may receive data requests from one or more entities. For example, as illustrated in the figure, request servicing engine 302 can receive data requests from web server 104, store 109, item data update system 105A, and item data update system 105B. The data requests may be, for example, to obtain (e.g., read) catalog data 370 from database 116. In some examples, the data requests may also be to store (e.g., write, update) catalog data 370 to database 116.

Catalog data 370 may include an item ID 372 (e.g., an SKU number), an item brand 374, an item type 376 (e.g., grocery item such as milk, clothing item), an item description 378 (e.g., a description of the product such as product features), item options 380 (e.g., item colors, sizes, flavors, etc.), an item price 382, and an item image(s) 384 (e.g., an image of the item displayed on a website, such as for advertising the item).

Upon receiving a data request, request servicing engine 302 may provide the data request to one of the first node engine 304, the second node engine 306, and the third node engine 308. Each of the node engine 304, 306, 308 may be a virtual machine (VM). Although only three node engines 304, 306, 308 are illustrated, data request protection computing device 102 may include any number of node engines.

Request servicing engine 302 may, in some examples, employ a round-robin technique to assign the data requests to the node engines 304, 306, 308. For example, request servicing engine 302 may assign a first data request, regardless of which entity transmitted the data request, to first node engine 304. Request servicing engine 302 may assign a second data request, also regardless of which entity transmitted it, to the second node engine 306. Request servicing engine 302 may further assign a third data request, also regardless of which entity transmitted it, to the third node engine 308. In continuing the round-robin technique, request servicing engine 302 may then assign a fourth data request, also regardless of which entity transmitted it, to the first node engine 304.

In some examples, each entity is assigned to a node engine 302, 304, 306. For example, web server 104 and item data update system 105A may be assigned to first node engine 304. Store 109 may be assigned to second node engine 306, and item data update system 105B may be assigned to third node engine 308. The node engine assignments may be configurable by an operator of data request protection computing device 102 and may be stored in database 116, for example. As data requests are received from each of the entities, request servicing engine 302 may determine the entity that transmitted the data request, and may provide each data request to the node engine 304, 306, 308 assigned to the determined entity.

Each node engine 304, 306, 308 may receive a data request obtained from request servicing engine 302, generate throttling request data identifying the entity (e.g., web server 104, store 109, item data update system 105A, item data update system 105B) based on the data request, and may transmit the throttling data to throttling enforcement engine 310.

Throttling enforcement engine 310 may receive throttling request data identifying an entity from the node engines 304, 306, 308. Throttling enforcement engine 310 may then determine whether a data request for the corresponding entity is allowed (e.g., is to be processed), and may generate throttling response data identifying whether the data request is to be allowed. Throttling enforcement engine 310 may respond to the corresponding node engine 304, 306, 308 with the throttling response data.

For example, throttling enforcement engine 310 maintains an initial throttling count 392 for each entity in database 116. Throttling enforcement engine 310 may initialize a corresponding throttling counter 324 with each initial throttling count 392. Throttling enforcement engine 310 may also maintain initial timer value 394 in database 116, and may initialize a timer 320 with initial timer value 394. Throttling enforcement engine 310 may initialize timer 320 and throttling counters 324 at startup as part of a startup routine, for example. Although only one timer 320 is illustrated, in some examples, multiple timers 320 are employed as described herein. For example, each of the timers 320 may be initialized with a differing initial timer value 394.

Once initialized, throttling enforcement engine 310 may enable (e.g., start) timer 320. When timer 320 expires, throttling enforcement engine 310 is configured to reset each of the throttling counters 324 with their corresponding initial throttling counts 392. In one implementation, timer 320, upon expiration, may provide a signal (e.g., interrupt) to throttling enforcement engine 310. In another implementation, throttling enforcement engine 310 may occasionally (e.g., periodically) poll timer 320 to determine if timer 320 expired.

Upon receiving throttling request data from one of the node engines 304, 306, 308, throttling enforcement engine 310 may determine the corresponding throttling counter 324 associated with the identified entity. Throttling enforcement engine 310 may further determine if the corresponding throttling counter is at a threshold value (e.g., 0). If throttling enforcement engine 310 determines that the corresponding throttling counter is at the threshold value, throttling enforcement engine 310 transmits to the corresponding node engine 304, 306, 308 throttling response data indicating that the data request is to not be allowed (e.g., not to be processed). If, however, throttling enforcement engine 310 determines that the corresponding throttling counter is not at the threshold value (e.g., is above the threshold value), throttling enforcement engine 310 responds to the node engine 304, 306, 308 with throttling response data indicating that the data request is to be allowed (e.g., processed).

Figure 4:
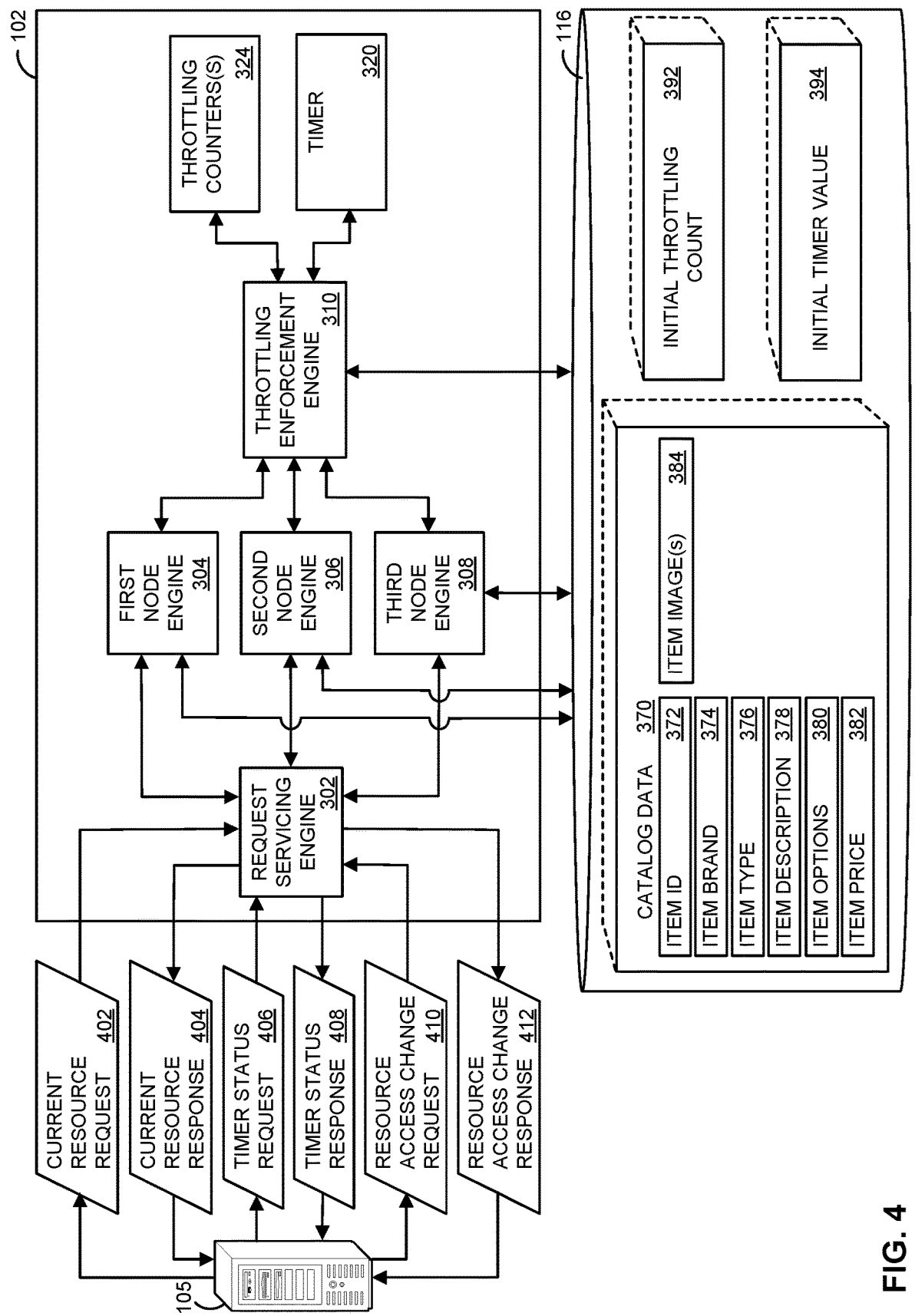
FIG. 4 is a block diagram illustrating further examples of various portions of the protected retail management system of FIG. 1 in accordance with some embodiments.

FIG. 4 is a block diagram illustrating examples of various portions of the protected retail management system 100 of FIG. 1. The figure illustrates various messages between item data update system 105 and data request protection computing device 102. Although item data update system 105 is illustrated, the same messages may be interchanged between web server 104 and data request protection computing device 102, and between store 109 and data request protection computing device 102.

As illustrated in the figure, item data update system 105 may transmit current resource request 402 to data request protection computing device 102, which may be received by remote sequence engine 302. Current resource request 402 is a request for the current throttling count (e.g., initial throttling count 392) assigned to an entity (e.g., customer), in this example, item data update system 105. In response to receiving current resource request 402, remote sequence engine 302 may request and receive, via one of the node engines 304, 306, 308, the initial throttling count 392 for the corresponding entity from throttling enforcement engine 310. Remote sequence engine 302 may package the initial throttling count 392 in current resource response 404, and transmit current resource response 404 to item data update system 105.

Similarly, item data update system 105 may transmit timer status request 406 to data request protection computing device 102, which may be received by remote sequence engine 302. Timer status request 406 is a request for the current timer value of timer 320 which, in some examples, may be a timer 320 that is assigned to item data update system 105. In response to receiving timer status request 406, remote sequence engine 302 may request and receive, via one of the node engines 304, 306, 308, the timer value of timer 320 from throttling enforcement engine 310. For example, throttling enforcement engine 310 may read a value from timer 320, and may provide the timer value to remote sequence engine 302. Remote sequence engine 302 may package the timer value in timer status response 408, and may transmit timer status response 408 to item data update system 105.

Item data update system 105 may also transmit resource change request 410 to data request protection computing device 102, which may be received by remote sequence engine 302. Resource change request 410 is a request to change the current throttling count (e.g., initial throttling count 392) assigned to an entity (e.g., customer), in this example, item data update system 105. In some examples, resource change request 410 identifies a request to increase the current throttling count for the entity. In some examples, resource change request 410 further identifies an amount by which to increase the currently throttling count. For example, resource change request 410 may identify a requested throttling count, or a percentage by which to increase the current throttling count.

In response to receiving resource change request 410, remote sequence engine 302 may display (e.g., via display 206) to an operator of data request protection computing device 102 the request to change the throttling count. In some examples, remote sequence engine 302 transmits (e.g., via transceiver 204) a communication to the operator of data request protection computing device 102. The operator may provide a response, such as by adjusting the throttling count 392 for the entity, or by denying the request. In some examples, remote sequence engine 302 executes an algorithm, such as a machine learning model, to determine whether the request should be satisfied.

If the response is to be satisfied (in part or whole), remote sequence engine 302 may send a message to throttling enforcement engine 310 (e.g., via one of the node engines 304, 306, 308) to adjust the corresponding throttling count 392. Remote sequence engine 302 may also generate resource change response 412 identifying the response (e.g., whether the request is satisfied, in whole or in part), and may transmit resource change response 412 to item data update system 105.

Figure 5A:
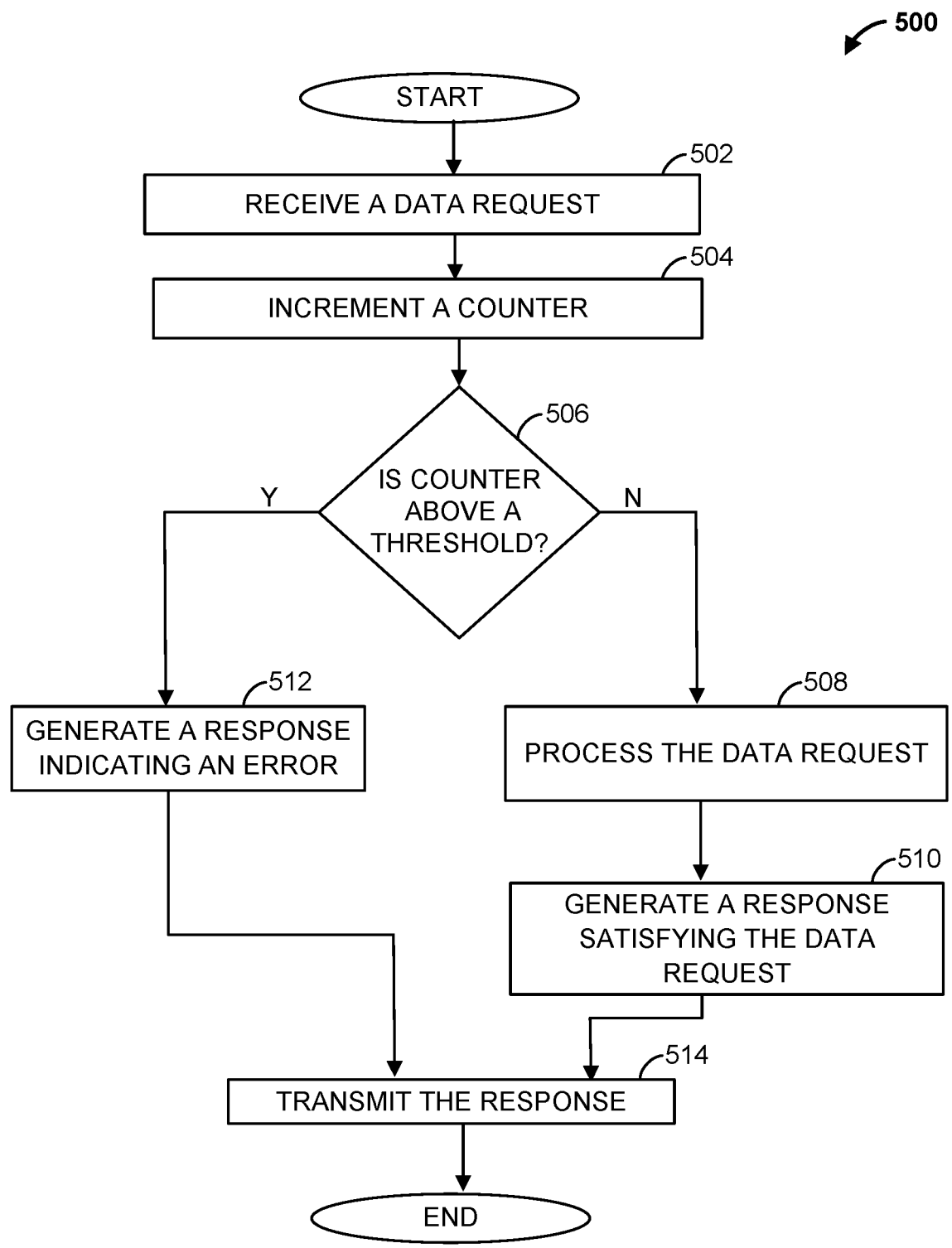
FIGS. 5A and 5B are flowcharts of example methods that can be carried out by the data request protection computing device of FIG. 1 in accordance with some embodiments.

FIG. 5A is a flowchart of an example method 500 that can be carried out by a computing device, such as the data request protection computing device 102 of FIG. 1. At step 502, a data request is received. The data request may be a request to access data, such as catalog data 370 stored in database 116. For example, the data request may be to read data from, or write data to, database 116. At step 504, a counter is incremented. The counter may be a throttling counter assigned to an entity.

Proceeding to step 506, a determination is made as to whether the counter is above a threshold. The threshold may be a predetermined threshold stored in database 116. If the counter is above the threshold, the method proceeds to step 512 where a response is generated indicating an error. For example, the response may be an HTTP 429 error. The method then proceeds to step 514, where the response is transmitted.

Otherwise, if at step 506 the counter is not above the threshold, the method proceeds to step 508, where the data request is processed. For example, if the data request is a request to obtain at least a portion of catalog data 370, the requested catalog data may be obtained from database 116. If the data request is a request to write (e.g., update) at least a portion of catalog data 370, the requested catalog data 370 is written to database 116. The method then proceeds to step 510, where a response is generated that satisfies the data request. For example, if the data request was a read request, the generated response includes the obtained data. If the data request was a write request, the generated response may include an indication that the data was written as requested. The method then proceeds to step 514, where the response is transmitted.

Figure 5B:
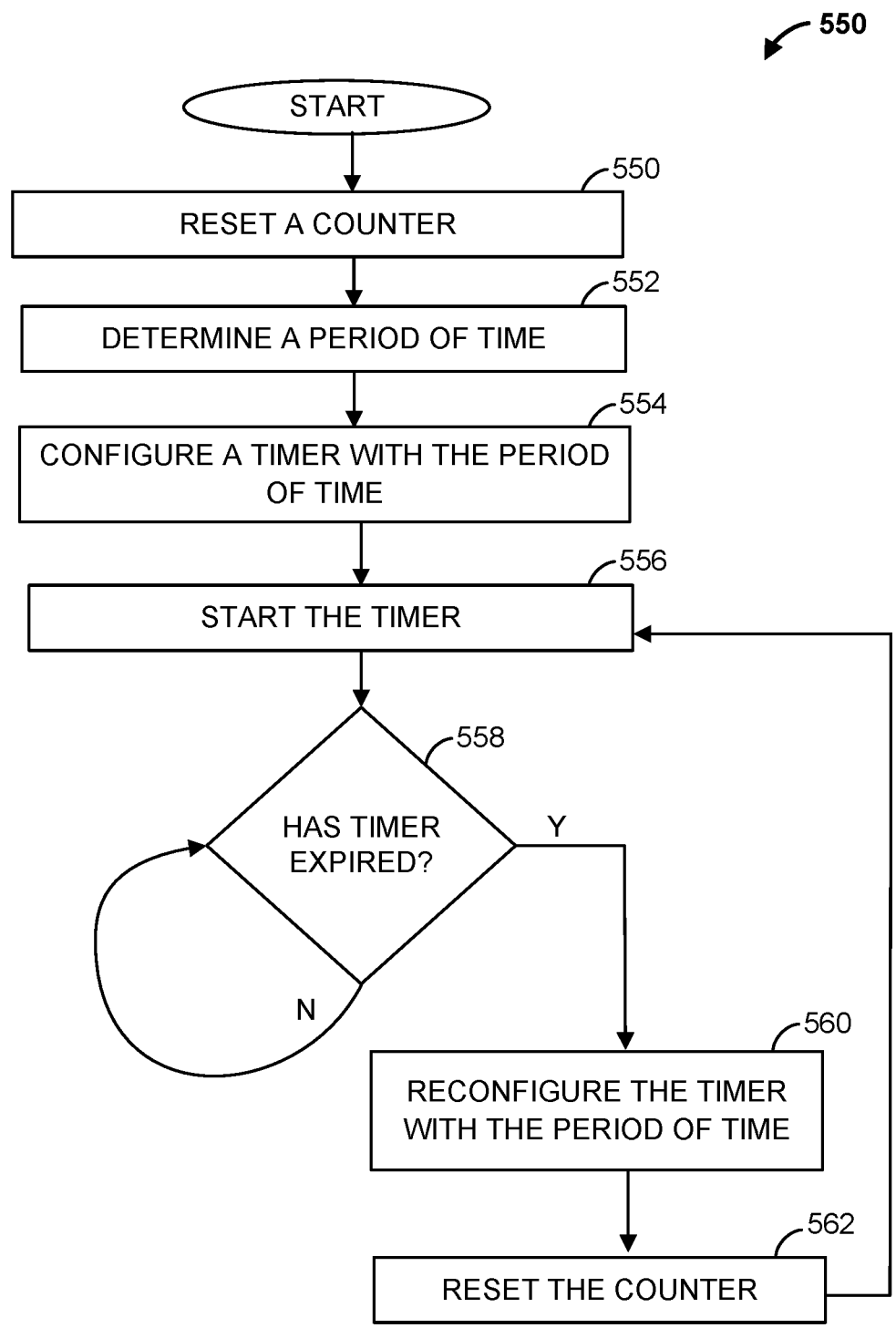

FIG. 5B is a flowchart of an example method 550 that can be carried out by the computing device, such as the data request protection computing device 102 of FIG. 1. Beginning at step 550, a counter is reset. For example, the computing device may reset a throttling counter for an entity to an initial value. At step 552, a period of time is determined. The period of time may be a setting configurable by a user and stored in database 116, for example. The computing device may read the setting to determine the period of time. At step 554, a timer is configured with the determined period of time. For example, the computing device may initialize timer 320 with the period of time. The period of time may be, for example, a minute. At step 556, the timer is started. For example, the computing device may enable the timer to begin counting down from the period of time.

Proceeding to step 558, a determination is made as to whether the timer has expired (e.g., the period of time has passed since the timer was enabled). For example, the computing device may occasionally poll the timer to determine if the timer has reached zero. Once a determination is made that the timer has expired, the method proceeds to step 560. At step 560, the timer is reconfigured with the period of time. For example, the computing device may reinitialize timer 320 with the period of time. The method then proceeds to step 562, where the counter is reset. For example, the computing device may reset the throttling counter for the entity to the initial value. The throttling counter may have been adjusted (e.g., decremented) for every data request received from the entity, for example. The method then proceeds back to step 556, where the timer is re-started.

Figure 6:
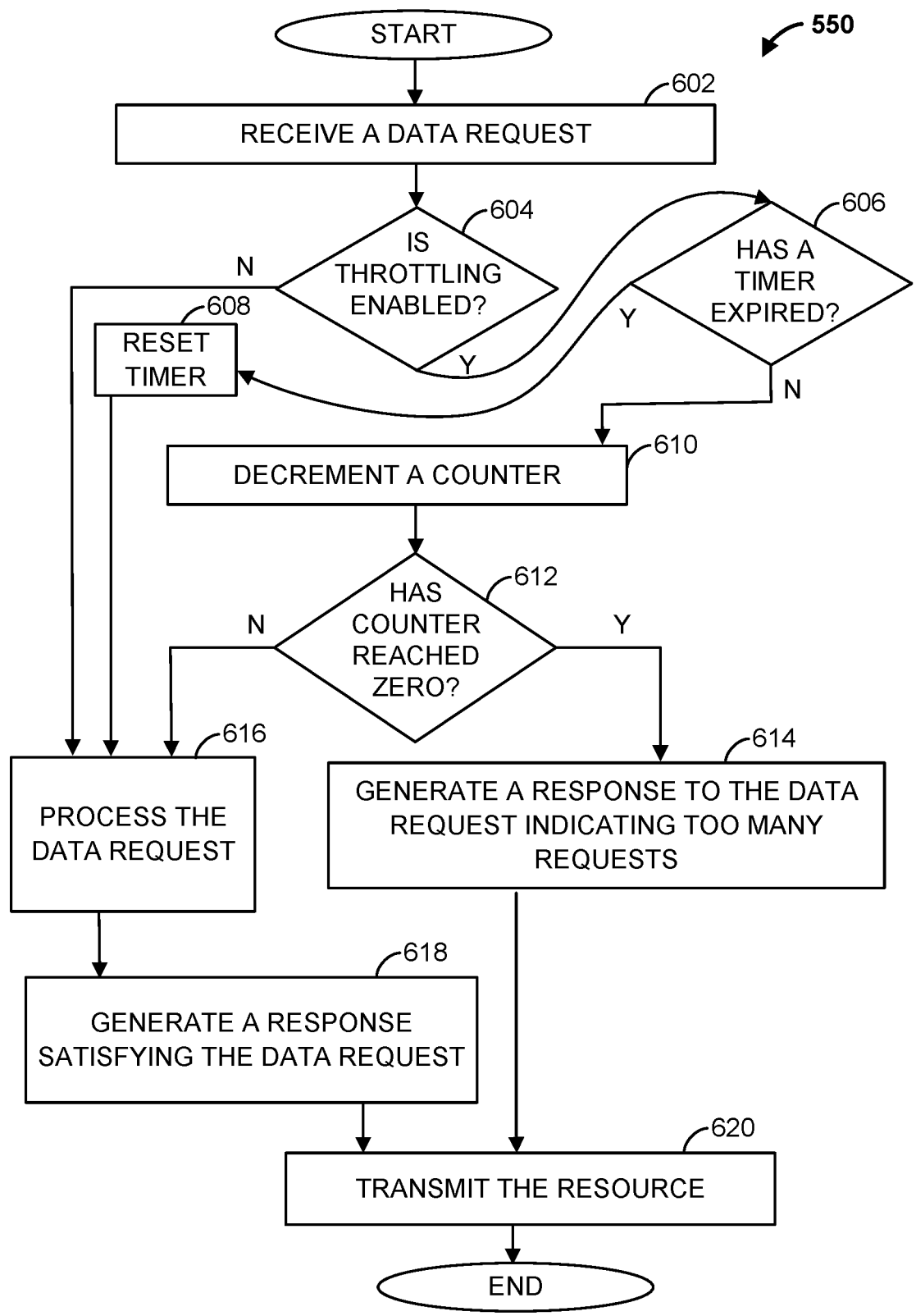
FIG. 6 is a flowchart of another example method that can be carried out by the data request protection computing device of FIG. 1 in accordance with some embodiments.

FIG. 6 is a flowchart of an example method 600 that can be carried out by a computing device, such as the data request protection computing device 102 of FIG. 1. Beginning at step 602, a data request is received. At step 604, a determination is made as to whether throttling is enabled. In some examples, throttling may be enabled globally (e.g., for all customers). In some examples, throttling may be enabled per customer. If throttling is not enabled, the method proceeds to step 616. Otherwise, if throttling is enabled, the method proceeds to step 606, where a determination is made as to whether a timer, such as timer 320, has expired. If the timer has expired, the method proceeds to step 608. At step 608, the timer is reset (e.g., reinitialized with an initial value), and the method proceeds to step 616. If at step 606, however, the timer has not expired, the method proceeds to step 610.

At step 610, a counter is decremented. For example, the computing device may decrement a throttling counter assigned to the customer associated with the received data request. The method then proceeds to step 612, where a determination is made as to whether the counter has reached zero. Zero is merely used an example, and any other value or threshold amount may be employed. If the counter has not reached zero, the method proceeds to step 616.

At step 616, the data request is processed. For example, if the data request is a request to obtain at least a portion of catalog data 370, the requested catalog data may be obtained from database 116. If the data request is a request to write (e.g., update) at least a portion of catalog data 370, the requested catalog data 370 is written to database 116. The method then proceeds to step 618, where a response is generated that satisfies the data request. For example, if the data request was a read request, the generated response includes the obtained data. If the data request was a write request, the generated response may include an indication that the data was written as requested.

Back at step 612, if the counter has not reached zero, the method proceeds to step 614. At step 614, a response is generated indicating that too many data requests have been received from the customer. For example, the response may include an HTTP 429 error.

From step 614, or from step 618, the method proceeds to step 620, where the generated response is transmitted. For example, the computing device may transmit the generated response to a device that transmitted the data request. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising: a computing device comprising at least one processor and configured to:
receive a first data request from a first entity;
satisfy the first data request by obtaining data from, or storing data to, a database, when throttling is not enabled for the first entity;
determine whether a timer has expired, when throttling is enabled for the first entity;
when the timer has expired, reset the timer and satisfy the first data request by obtaining data from, or storing data to, the database;
when the timer has not expired, determine whether a first counter corresponding to the first entity is above a first threshold, generate a first response to the first data request based on the determination of whether the first counter is above the first threshold, wherein the first response is generated based on:

satisfying the first data request when the first counter is above the first threshold by obtaining data from, or storing data to, the database, and indicating a time value of the timer and an error to the first data request in the first response when the first counter is not above the first threshold, and transmit the first response to the first entity.

2. The system of claim 1, wherein the computing device is configured to: initialize the first counter to an initial value;

determine when a first period expires; and reset the first counter to the initial value when the first period expires.

3. The system of claim 2, wherein determining when the first period expires comprises:

initializing the timer with the first period;

starting the timer; and determining that the first period expires based on the timer expiring.

4. The system of claim 3, wherein determining that the first period expires based on the timer expiring comprises:

receiving an interrupt; and determining that the first period expires based on receiving the interrupt.

5. The system of claim 2, wherein determining when the first period expires comprises polling the timer to determine when the first period expires.

6. The system of claim 1, wherein the computing device is configured to read and save a value of the first counter, when the timer expires.

7. The system of claim 1, wherein the time value identifies a remaining amount of time in the timer.

8. The system of claim 1, wherein the computing device is configured to:

receive a second data request;

determine that the second data request is from a second entity;

adjust a second counter in response to determining that the second data request is from the second entity;

determine whether the second counter is beyond a second threshold;

generate a second response to the second data request based on the determination of whether the second counter is beyond the second threshold; and transmit the second response to the second entity.

9. The system of claim 8, wherein the computing device is configured to:

assign the first counter to the first entity; and assign the second counter to the second entity.

10. A method by a computing device comprising at least one processor, the method comprising:

receiving a first data request from a first entity;

satisfying the first data request by obtaining data from, or storing data to, a database, when throttling is not enabled for the first entity;

determining whether a timer has expired, when throttling is enabled for the first entity;

when the timer has expired, resetting the timer and satisfying the first data request by obtaining data from, or storing data to, the database;

when the timer has not expired, determining whether a first counter corresponding to the first entity is above a first threshold, generating a first response to the first data request based on the determination of whether the first counter is above the first threshold, wherein generating the first response comprises:

satisfying the first data request when the first counter is above the first threshold by obtaining data from, or storing data to, the database, and indicating a time value of the timer and an error to the first data request in the first response when the first counter is not above the first threshold, and transmitting the first response to the first entity.

11. The method of claim 10, further comprising:

initializing the first counter to an initial value;

determining when a first period expires; and resetting the first counter to the initial value when the first period expires.

12. The method of claim 11, wherein determining when the first period expires comprises:

initializing the timer with the first period;

starting the timer; and determining that the first period expires based on the timer expiring.

13. The method of claim 10, wherein the time value identifies a remaining amount of time in the timer.

14. The method of claim 10, wherein satisfying the first data request comprises:

determining that the first data request is a read request;

obtaining the data from the database based on the read request; and transmitting the obtained data in the first response to the first entity.

15. The method of claim 10, wherein satisfying the first data request comprises:

determining that the first data request is a write request;

obtaining the data from the first data request; and storing the data in the database.

16. A non-transitory computer readable medium having instructions stored thereon, wherein the instructions, when executed by at least one processor, cause a device to perform operations comprising:

receiving a first data request from a first entity;

satisfying the first data request by obtaining data from, or storing data to, a database, when throttling is not enabled for the first entity;

determining whether a timer has expired, when throttling is enabled for the first entity;

when the timer has expired, resetting the timer and satisfying the first data request by obtaining data from, or storing data to, the database;

when the timer has not expired, determining whether a first counter corresponding to the first entity is above a first threshold, generating a first response to the first data request based on the determination of whether the first counter is above the first threshold, wherein generating the first response comprises:

satisfying the first data request when the first counter is above the first threshold by obtaining data from, or storing data to, the database, and indicating a time value of the timer and an error to the first data request in the first response when the first counter is not above the first threshold, and transmitting the first response to the first entity.

17. The non-transitory computer readable medium of claim 16, further comprising instructions stored thereon that, when executed by the at least one processor, further cause the device to perform operations comprising:
  determining that the first data request is a read request;
  obtaining the data from the database based on the read request; and
  transmitting the obtained data in the first response to the first entity.

18. The non-transitory computer readable medium of claim 16, further comprising instructions stored thereon that, when executed by the at least one processor, further cause the device to perform operations comprising:
  determining that the first data request is a write request;
  obtaining the data from the first data request; and
  storing the data in the database.

* * * * *